United States Patent
Suk et al.

(10) Patent No.: US 7,599,309 B2
(45) Date of Patent: Oct. 6, 2009

(54) METHOD AND APPARATUS FOR MANAGING CELL-BY-CELL DEMODULATION TIMINGS OF A USER EQUIPMENT IN AN ASYNCHRONOUS MOBILE TELECOMMUNICATION SYSTEM

(75) Inventors: Won-Kyu Suk, Suwon-si (KR); Jung-Hwan Rim, Seongnam-si (KR); Joo-Kwang Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 384 days.

(21) Appl. No.: 11/226,371

(22) Filed: Sep. 15, 2005

(65) Prior Publication Data
US 2006/0072515 A1  Apr. 6, 2006

(30) Foreign Application Priority Data
Sep. 17, 2004 (KR) .................. 10-2004-0074537

(51) Int. Cl.
 *H04J 3/06* (2006.01)
(52) U.S. Cl. ............ 370/252; 370/335; 370/509; 370/209; 370/516; 370/342; 370/338; 370/503; 370/333; 370/322; 375/145; 375/354; 455/517; 455/513
(58) Field of Classification Search ........... 455/442, 455/436, 438, 443; 370/331, 332, 321
See application file for complete search history.

(56) References Cited
U.S. PATENT DOCUMENTS

| 5,457,689 | A | 10/1995 | Marvit et al. |
| 5,471,469 | A | 11/1995 | Flammer, III et al. |
| 5,559,803 | A | 9/1996 | Sakai et al. |
| 5,570,084 | A | 10/1996 | Ritter et al. |
| 5,812,531 | A | 9/1998 | Cheung et al. |
| 5,991,287 | A | 11/1999 | Diepstraten et al. |
| 6,006,017 | A | 12/1999 | Joshi et al. |
| 6,044,069 | A | 3/2000 | Wan |
| 6,097,954 | A * | 8/2000 | Kumar et al. ............ 455/442 |
| 6,208,632 | B1 * | 3/2001 | Kowalski et al. ............ 370/335 |
| 6,256,300 | B1 | 7/2001 | Ahmed et al. |

(Continued)

FOREIGN PATENT DOCUMENTS

WO  WO 03/013040 A1  2/2003

*Primary Examiner*—Charles N Appiah
*Assistant Examiner*—Randy Peaches
(74) *Attorney, Agent, or Firm*—Roylance, Abrams, Berdo & Goodman, L.L.P.

(57) ABSTRACT

A method and an apparatus are provided for managing cell-by-cell demodulation timing of an asynchronous user equipment (UE) for demodulating multipath signals, received from a plurality of cells, in a plurality of fingers. Mapping information, indicating fingers mapped on a cell-by-cell basis, and demodulation information and demodulation timing information for the plurality of cells are acquired. The fingers are grouped on a cell-by-cell basis according to the mapping information. Demodulation information for an associated cell is provided to each of the grouped fingers. A signal received from the associated cell is demodulated in the grouped fingers by using the demodulation information for the associated cell. System load and costs can be reduced by managing demodulation timings on a cell-by-cell basis in the UE that simultaneously perform data transmission/reception with the cells in which transmission timings are different from each other in a soft handover situation in an asynchronous mobile telecommunication system.

10 Claims, 4 Drawing Sheets

U.S. PATENT DOCUMENTS

| | | |
|---|---|---|
| 6,430,172 B1 | 8/2002 | Usui et al. |
| 6,459,691 B1 | 10/2002 | Abe |
| 6,497,599 B1 | 12/2002 | Johnson et al. |
| 6,529,119 B1 | 3/2003 | Kumar et al. |
| 6,735,202 B1 | 5/2004 | Ahmed et al. |
| 6,775,242 B2 * | 8/2004 | Grilli et al. ............ 370/252 |
| 6,922,434 B2 * | 7/2005 | Wang et al. ............ 375/148 |
| 6,980,539 B2 * | 12/2005 | Hanada et al. ......... 370/342 |
| 7,190,750 B2 * | 3/2007 | Teague et al. .......... 375/347 |
| 2002/0051486 A1 * | 5/2002 | Aue ....................... 375/150 |
| 2002/0085719 A1 | 7/2002 | Crosbie |
| 2002/0145991 A1 * | 10/2002 | Miya et al. ............. 370/337 |
| 2003/0139197 A1 | 7/2003 | Kostic et al. |
| 2003/0227911 A1 | 12/2003 | Trossen |
| 2004/0068668 A1 | 4/2004 | Lor et al. |
| 2004/0095911 A1 | 5/2004 | Benveniste et al. |
| 2005/0141457 A1 | 6/2005 | Lee et al. |
| 2005/0152305 A1 | 7/2005 | Ji et al. |

* cited by examiner

| Address | Name | Description |
|---------|------|-------------|
| 0x00XX | RefFinger | INFO FOR ESTABLISHING REFERENCE FINGER |
| 0x00XX | F#CodeID | INFO FOR ESTABLISHING SCRAMBLING CODES ON FINGER-BY-FINGER BASIS |
| 0x00XX | F#ChOffset | INFO FOR ESTABLISHING CHANNEL OFFSETS ON FINGER-BY-FINGER BASIS |
| 0x00XX | F#Mode | INFO FOR ESTABLISHING DIVERSITY MODES ON FINGER-BY-FINGER BASIS |

FIG.1
(PRIOR ART)

| Address | Name | Description |
|---|---|---|
| 0x00XX | SetCell#FingerMap | INFO FOR ESTABLISHING FINGERS MAPPED ON CELL-BY-CELL BASIS ~202 |
| 0x00XX | SetCell#RefFinger | INFO FOR ESTABLISHING REFERENCE FINGERS ON CELL-BY-CELL BASIS ~204 |
| 0x00XX | SetRefCell | INFO FOR SELECTING REFERENCE CELL FROM MANY CELLS ~206 |
| 0x00XX | SetCell#Sfn | INFO FOR LOADING SFN VALUES AND MANAGING TIMINGS ON CELL-BY-CELL BASIS ~208 |
| 0x00XX | SetCell#CodeID | INFO FOR ESTABLISHING SCRAMBLING CODES ON CELL-BY-CELL BASIS ~210 |
| 0x00XX | SetCell#ChOffset | INFO FOR ESTABLISHING CHANNEL OFFSETS ON CELL-BY-CELL BASIS ~212 |
| 0x00XX | SetCell#Mode | INFO FOR ESTABLISHING MODES ON CELL-BY-CELL BASIS ~214 |

FIG.2

METHOD AND APPARATUS FOR MANAGING CELL-BY-CELL DEMODULATION TIMINGS OF A USER EQUIPMENT IN AN ASYNCHRONOUS MOBILE TELECOMMUNICATION SYSTEM

PRIORITY

This application claims the benefit under 35 U.S.C. §119 (a) of a Korean Patent Application entitled "Method and Apparatus for Managing Cell-by-Cell Demodulation Timings of a User Equipment in an Asynchronous Mobile Telecommunication System", filed in the Korean Intellectual Property Office on Sep. 17, 2004, and assigned Serial No. 2004-74537, the entire contents of which are hereby incorporated by reference.

BACKGROUND OF THE INVENTION

1. Field of the Invention

The present invention generally relates to asynchronous mobile telecommunication terminals. More particularly the present invention relates to a method and apparatus for managing demodulation timings on a cell-by-cell basis.

2. Description of the Related Art

Third-generation (3G) mobile telecommunication systems use code division multiple access (CDMA) technology, and provide a consistent set of services capable of transmitting packet-based text, digitized voice or video, and multimedia data at data rates of 2 megabits per second (Mbps) or more no matter where mobile phone or terminal users are located in the world. These 3G mobile telecommunication systems are classified into universal mobile telecommunication service (UMTS) adopted as the European standard and CDMA-2000 adopted as the American standard.

CDMA-2000 is a synchronous mobile telecommunication system based on second-generation (2G) CDMA systems such as Interim Standard-95 (IS-95), J-STD008, and so on used in South Korea, the United States, Japan, and others. UMTS is an asynchronous mobile telecommunication system using CDMA on the basis of a global system for mobile communications (GSM) and general packet radio services (GPRS) widely used in Europe and other regions.

Conventionally, a synchronous cellular mobile telecommunication system is synchronized with global positioning system (GPS) clock on a cell-by-cell basis or on a Node B-by-Node B basis in a wireless environment and transmits data at designated times. Accordingly, once synchronization is acquired through a pilot channel, the system does not need to acquire synchronization for other cells and demodulates data by using existing timing information.

On the other hand, an asynchronous cellular mobile telecommunication system transmits data at different times on the Node B-by-Node B basis (hereinafter, referred to as the cell-by-cell basis) regardless of GPS time. Then, an asynchronous user equipment (UE) acquires transmission timing for each cell which uses a common pilot channel (CPICH) serving as a reference signal sent on the cell-by-cell basis, and demodulates data in synchronization with the transmission timing.

In the asynchronous UE, fingers demodulate multipath signals of a radio channel and transmission timings are managed on a finger-by-finger basis. The fingers are hardware devices for demodulating the multipath signals in a RAKE receiver. Control information for controlling the operation of each finger is managed in a register file such that the fingers can refer to the control information. The register file includes information and commands for controlling hardware of a physical layer using a control message of a higher layer in a microprocessor.

FIG. 1 is a table illustrating a conventional register file having control information for finger-by-finger management.

Referring to FIG. 1, RefFinger 102 is information for establishing a reference finger among a plurality of fingers provided in the UE of an asynchronous system. F#CodeID 104 is information for establishing scrambling codes on a finger-by-finger basis and finding cell-by-cell timings of data sent from Node Bs to a UE. F#ChOffset 106 is information for establishing CPICH offsets on a finger-by-finger basis to transmit information to the fingers. F#Mode 108 is information for establishing diversity modes on a finger-by-finger basis. The diversity modes are space-time transmit diversity (STTD) mode, transmit adaptive array (TXAA) mode, normal mode, and so on.

A physical layer of the asynchronous UE is configured such that it can receive control messages downloaded from a higher layer configured by a microprocessor on a finger-by-finger basis. Accordingly, the asynchronous UE receives control information for scrambling codes, channel offsets, diversity modes, and so on from a higher level on the cell-by-cell basis, manages the control information in a register file, and distributes the control information on a finger-by-finger basis.

As described above, the conventional UE of the asynchronous mobile telecommunication system repeats an operation for reading control information sent on the cell-by-cell basis and distributing the read control information on a finger-by-finger basis a number of times corresponding to the number of fingers. Accordingly, there is a problem in that the occupancy time and load of the microprocessor increases. When the asynchronous UE manages data sent from cells at different times on a finger-by-finger basis, communication may be dropped when a soft handover is performed.

SUMMARY OF THE INVENTION

Accordingly, the present invention has been designed to solve the above and other problems occurring in the prior art and to provide other advantages. Therefore, exemplary embodiments of the present invention provide a method and apparatus for detecting timing on a cell-by-cell basis such that a user equipment (UE) of an asynchronous mobile telecommunication system can demodulate data.

An aspect of the present invention is to provide a method and apparatus for managing demodulation timings on a cell-by-cell basis to support seamless communication when a soft handover is performed.

Another aspect of the present invention is to provide a method and apparatus that can suitably apply cell-by-cell control messages sent from a higher layer to a physical layer in order to manage demodulation timings on a cell-by-cell basis.

In accordance with an exemplary embodiment of the present invention, a method of mapping comprises the steps of acquiring mapping information, indicating a plurality of fingers mapped on a cell-by-cell basis, and demodulation information and demodulation timing information for a plurality of cells, grouping the plurality of fingers on the cell-by-cell basis according to the mapping information; providing demodulation information for an associated cell to each of the grouped fingers, and demodulating a signal received from the associated cell in the grouped fingers using the demodulation information for the associated cell.

In accordance with an exemplary embodiment of the present invention, an apparatus comprises a RAKE receiver configured by a plurality of fingers, and a cell management control unit for acquiring mapping information, indicating the plurality of fingers mapped on a cell-by-cell basis, and demodulation information and demodulation timing information for a plurality of cells, grouping the plurality of fingers on the cell-by-cell basis according to the mapping information, and providing demodulation information for an associated cell to each of the grouped fingers.

BRIEF DESCRIPTION OF THE DRAWINGS

The above and other aspects and advantages of the present invention will be more clearly understood from the following detailed description taken in conjunction with the accompanying drawings, in which:

FIG. 1 is a table illustrating a conventional register file having control information for finger-by-finger timing management;

FIG. 2 is a table illustrating a register file having control information for managing cell-by-cell demodulation timings for data signals in accordance with an exemplary embodiment of the present invention;

Throughout the drawings, like reference numerals will be understood to refer to like parts, components and structures.

DETAILED DESCRIPTION OF EXEMPLARY EMBODIMENTS

Figure 3:
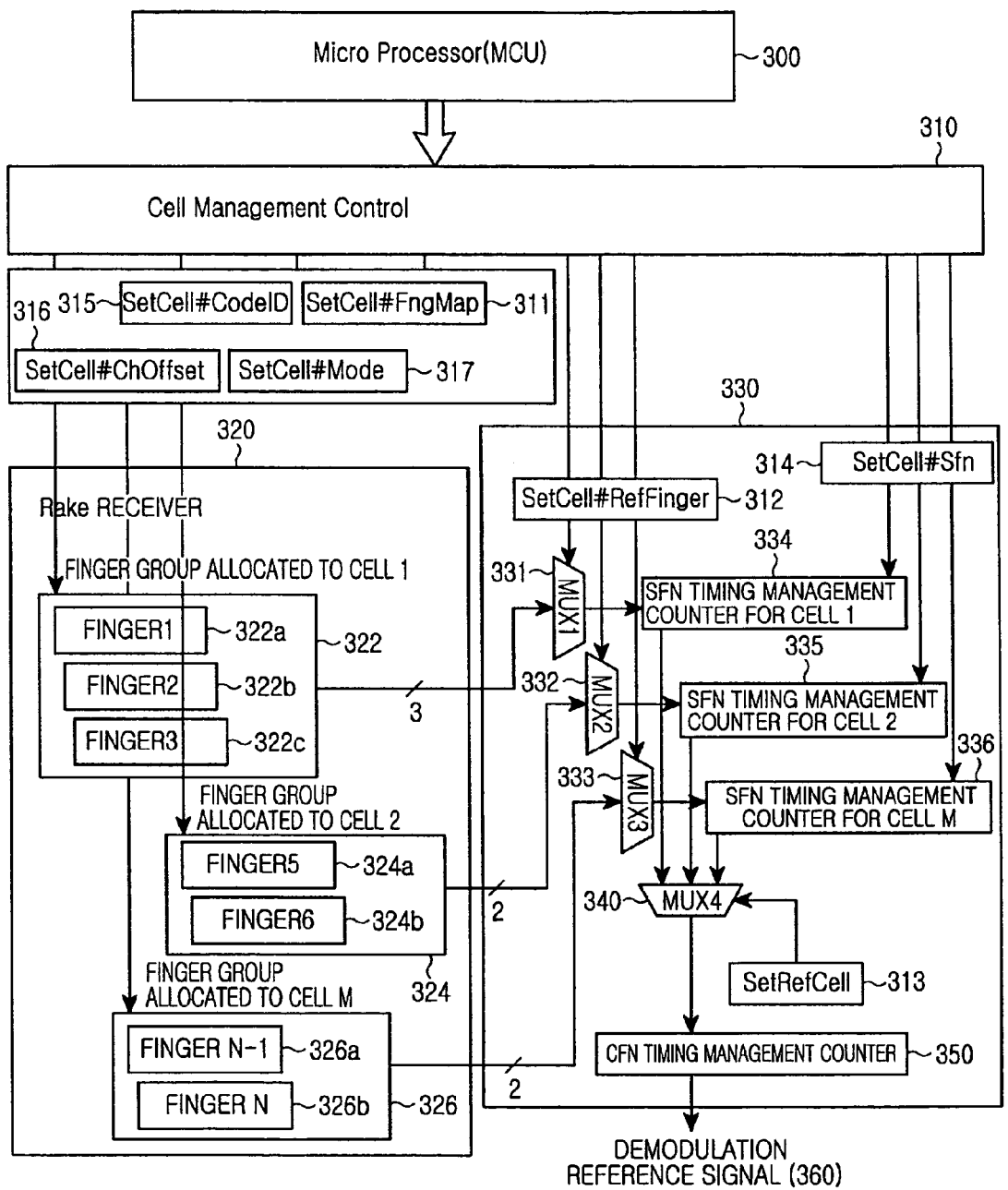
FIG. 3 is a block diagram illustrating a structure of a receiver of an asynchronous user equipment (UE) in accordance with an exemplary embodiment of the present invention.

Operation principles of exemplary embodiments of the present invention will be described in detail herein below with reference to the accompanying drawings. In the following description, detailed descriptions of functions and configurations incorporated herein that are well known to those skilled in the art are omitted for clarity and conciseness. It is to be understood that the phraseology and terminology employed herein are for the purpose of description and should not be regarded as limiting the present invention.

In a cellular mobile telecommunication system, a user equipment (UE) acquires synchronization using scrambling codes designated on a cell-by-cell basis. When multipath components due to reflection in air are present in each cell, the UE measures magnitudes of signals of respective paths and manages timing of cell-by-cell multipath components. The cell-by-cell multipath components are demodulated when they have a predetermined magnitude. That is, timing of multipath components recently demodulated must be managed on a cell-by-cell basis. In accordance with an exemplary embodiment of the present invention, the UE has mapping information of fingers allocated on the cell-by-cell basis, and selects reference paths (such as, fingers) on the cell-by-cell basis, and manages timing for an associated cell. The reason why timings are managed on the cell-by-cell basis is that system frame numbers (SFNs) of cell-by-cell data transmission timings must be managed and a synchronization time point for data to be demodulated must be managed such that seamless data transmission/reception can be performed in a soft handover situation.

For example, the UE uses a demodulation reference signal serving as a signal for determining a demodulation time point of a transport channel for connecting a physical channel to a logical channel. The demodulation reference signal is generated in relation to timing information managed for a reference cell among timing information managed on the cell-by-cell basis. When the reference cell is changed in the soft handover situation, timing information of the reference cell is corrected by using a time displacement value between an SFN and a connection frame number (CFN) of data demodulation timing in the UE, such that a new demodulation reference signal is generated.

FIG. 2 is a table illustrating a register file having control information for managing cell-by-cell demodulation timings in accordance with an exemplary embodiment of the present invention. In the following descriptions, the meaning of the above-described information will be described in greater detail.

Referring to FIG. 2, the control information comprises mapping information, demodulation timing information, and demodulation information. The amount of control information corresponds to the number of cells.

SetCell#FingerMap 202 is information for establishing fingers mapped to each cell, where # indicates a cell number. There are elements of SetCell#FingerMap 202 corresponding to the number of cells. According to the mapping information, all fingers are grouped into finger groups corresponding to the number of cells. For example, SetCell3FingerMap indicates a plurality of fingers allocated to Cell 3. The fingers are assigned multipath components based on synchronization acquisition for an associated cell, and perform a demodulation operation. The fingers grouped according to the mapping information are managed on a cell-by-cell basis, and are used for power control or timing management operating on a cell-by-cell basis.

SetCell#RefFinger 204, SetRefCell 206, and SetCell#SFN 208 are information for managing demodulation timing such that the fingers mapped to each cell demodulate data. Similarly, there are elements of SetCell#RefFinger 204 and SetCell#SFN 208 corresponding to the number of cells, where # indicates a cell number.

SetCell#RefFinger 204 is information for establishing a reference finger among fingers mapped to each cell. For example, SetCell3RefFinger indicates a reference finger among the fingers allocated to Cell 3. The established reference finger becomes a reference for managing timing of an associated cell. SetRefCell 206 is information for establishing a reference cell among many cells. Here, the reference cell timing becomes a reference for managing the entire timing of a UE receiver.

SetCell#SFN 208 is information for establishing system frame number (SFN) values on a cell-by-cell basis. For example, SetCell3SFN indicates the current SFN of Cell #3. Cell-by-cell demodulation timings are managed by using SFNs established on the cell-by-cell basis. The UE receiver detects a demodulation start time point of a transport channel for connecting a physical channel to a logical channel by using time displacement information between the CFN of the reference cell and the SFNs set on the cell-by-cell basis.

SetCell#CodeID 210, SetCell#ChOffset 212, and SetCell#Mode 214 comprise demodulation information for demodulating data in fingers mapped on a cell-by-cell basis. Similarly, there is demodulation information corresponding to the number of cells. Here, # indicates a cell number. The cell-by-cell demodulation information is provided to grouped fingers according to the mapping information. For example, SetCell3CodeID, SetCell3ChOffset, and SetCell3Mode are provided to fingers allocated to Cell 3.

SetCell#CodeID 210 indicates scrambling codes established in multipath demodulation fingers according to SetCell#FingerMap 202. Cells have different scrambling codes. The UE receiver identifies data of an associated cell through scrambling codes of the cells.

SetCell#ChOffset 212 is information for establishing channel offsets on a cell-by-cell basis such that a plurality of user data can be transmitted at similar timing wirelessly.

SetCell#Mode 214 indicates diversity modes established on a cell-by-cell basis when receive diversity is applied and different receive diversity modes operate between cells. The diversity modes can be established on a finger-by-finger basis by using SetCell#FingerMap 202. The UE receiver performs decoding in the diversity mode of a reference cell among diversity modes of many cells by using reference cell information.

FIG. 3 is a block diagram illustrating a structure of a receiver of an asynchronous UE in accordance with an exemplary embodiment of the present invention.

Referring to FIG. 3, a microprocessor, for example, a micro controller unit (MCU) 300 controls the overall operation of the receiver. Specifically, the MCU 300 sends control information for finger groups 322, 324, and 326 of a RAKE receiver 320 to a cell management control unit (CMC) 310. The CMC 310 manages, in a register file, control information provided from the MCU 300 on the cell-by-cell basis. As described above, the control information comprises mapping information, demodulation information, and demodulation timing information.

According to SetCell#FingerMap 311 serving as the mapping information, the CMC 310 groups fingers into the finger groups 322, 324, and 326 corresponding to the number of cells on the cell-by-cell basis. The CMC 310 provides SetCell#CodeID 315, SetCell#ChOffset 316, SetCell#Mode 317 serving as the demodulation information of an associated cell to the grouped fingers. The CMC 310 provides SetCell#RefFinger 312, SetRefCell 313, and SetCell#Sfn 314 serving as the demodulation timing information. The CMC 310 provides SetCell#RefFinger 312 to multiplexers (MUX 1, MUX 2, and MUX 3) 331, 332, and 333 associated with cells. The CMC 310 provides SetCell#Sfn 314 to cell-by-cell SFN timing management counters 334, 335, and 336. The CMC 310 provides SetRefCell 313 to a multiplexer (MUX 4) 340.

The RAKE receiver 320 comprises the finger group 322 for Cell #1, the finger group 324 for Cell 2, and the finger group 326 for Cell M. The finger group 322 for Cell 1 to the finger group 326 for Cell M comprises a plurality of fingers allocated according to SetCell#FingerMap 311 of the MCU 300, respectively. That is, the finger group 322 for Cell 1 is configured by Finger-1 322a, Finger-2 322b, and Finger-3 322c. The finger group 324 for Cell 2 comprises Finger-5 324a and Finger-6 324b. The finger group 326 for Cell M is configured by Finger-N-1 326a and Finger-N 326b. As described above, all N fingers are grouped on a cell-by-cell basis and are mapped to M cells through which the asynchronous UE performs communication based on a soft handover. Here, because a searcher for providing timing offsets of multipath components to fingers is not directly associated with the subject matter of the present invention, its description is omitted.

In the finger groups 322, 324, and 326 for Cells 1, 2, and M, different scrambling codes are established according to SetCell#CodeID 315, and channel offset values associated with the CPICH of the reference cell are established according to SetCell#ChOffset 316, and diversity modes are established according to SetCell#Mode 317.

The SFN timing management counter 334 for Cell 1, the SFN timing management counter 335 for Cell 2, and the SFN timing management counter 336 for Cell M manage SFNs and demodulation timings of the finger groups 322, 324, and 326 for Cells 1, 2, and M according to SetCell#Sfn 314 provided from the CMC 310.

Now, a timing management operation will be described in greater detail.

MUX-1 331 connected to the finger group 322 for Cell 1 acquires reference finger information for Cell 1 through SetCell#RefFinger 312 from the CMC 310, and selects synchronization timing of a reference finger for Cell 1 from synchronization timings of multipath components received by Finger-1 322a to Finger-3 322c of the finger group 322 for Cell 1 according to the reference finger information for Cell 1. Here, the synchronization timing of each finger indicates a signal synchronized with a frame boundary used in each finger, that is, a frame boundary signal. The SFN timing management counter 334 for Cell 1 acquires an SFN for Cell 1 through SetCell#Sfn 314 from the CMC 310, and outputs a value of the SFN at the synchronization timing of the reference finger for Cell 1.

MUX-2 332 connected to the finger group 324 for Cell 2 acquires reference finger information for Cell 2 through SetCell#RefFinger 312 from the CMC 310, and selects synchronization timing of a reference finger for Cell 2 from synchronization timings of multipath components received by Finger-5 324a and Finger-6 324b of the finger group 324 for Cell 2 according to the reference finger information for Cell 2. The SFN timing management counter 335 for Cell 2 acquires an SFN for Cell 2 through SetCell#Sfn 314 from the CMC 310, and outputs a value of the SFN at the synchronization timing of the reference finger for Cell 2.

MUX-3 333 connected to the finger group 326 for Cell M acquires reference finger information for Cell M through SetCell#RefFinger 312 from the CMC 310, and selects synchronization timing of a reference finger for Cell M from synchronization timings of multipath components received by Finger-N-1 324a and Finger-N 326b for Cell M according to the reference finger information for Cell M. The SFN timing management counter 336 for Cell M acquires an SFN for Cell M through SetCell#Sfn 314 from the CMC 310, and outputs a value of the SFN at the synchronization timing of the reference finger for Cell M.

The SFN for the reference cell is required to detect demodulation timing. Because the reference cell is continuously changed according to the soft handover, the CMC 310 provides SetRefCell 313 indicating reference cell information to MUX-4 340. MUX-4 340 selects an SFN value of the reference cell from the SFN values of the cells output by the SFN timing management counter 334 for Cell 1 to the SFN timing management counter 336 for Cell M, and outputs the selected SFN value to a connection frame number (CFN) timing management counter 350. The CFN timing management counter 350 tracks a CFN of the UE by using time displacement measurement between the SFN of the reference cell information 313 and the CFN of the UE. Accordingly, the CFN timing management counter 350 adjusts the CFN of the UE such that the CFN of the UE is synchronized with the SFN value for the reference cell, and generates a demodulation reference signal 360 indicating a value of the adjusted CFN. Here, the MUXs 331, 332, 333, and 340, the SFN timing management counters 334, 335, and 336, and the CFN timing management counter 350 configure a demodulation timing management unit 330.

As described above, if the SFN for the reference cell is synchronized with the CFN of the UE, the fingers 322a to 326b for all cells demodulate received data to output the demodulated data in response to the demodulation reference signal 360 by using demodulation information, indicating scrambling codes, channel offsets, and diversity modes for cells, acquired through the CMC 310. After a predetermined offset is applied between transmission and reception, the demodulation reference signal 360 is provided to a transmitter of the UE and is used for transmission timing.

Figure 4:
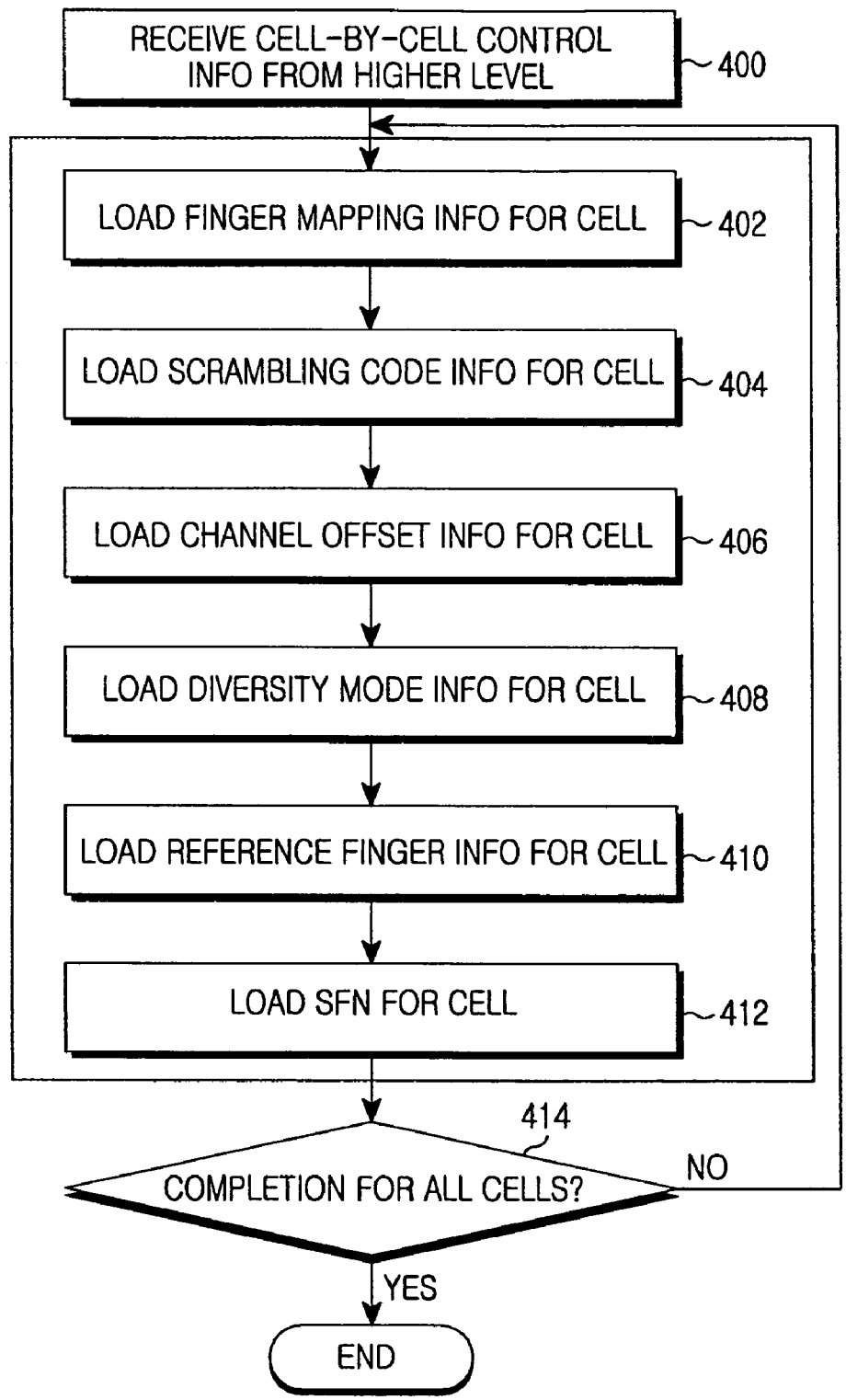
FIG. 4 is a flow chart illustrating a procedure for processing control information from a higher level on a cell-by-cell basis in a cell management control unit (CMC) of the receiver of the asynchronous UE in accordance with an exemplary embodiment of the present invention.

FIG. 4 is a flow chart illustrating a procedure for processing finger control information on a cell-by-cell basis in the CMC of the receiver of the asynchronous UE in accordance with an exemplary embodiment of the present invention. In the example given, the total number of cells through which the UE can receive data is M, and the total number of fingers is N, where M is less than N.

Referring to FIG. 4, the CMC 310 receives cell-by-cell control information provided from the higher layer in step 400, and proceeds to the next step to load demodulation information and demodulation timing information on received data for each cell to the fingers of the RAKE receiver. Steps 402 through 412 operate on a cell-by-cell basis. That is, the CMC 310 loads mapping information (SetCell#FingerMap) indicating fingers mapped to each cell, and allocates fingers for an associated cell in step 402.

The CMC 310 loads scrambling code information (SetCell#CodeID) in step 404, loads channel offset information (SetCell#ChOffset) in step 406, and loads diversity mode information (SetCell#Mode) in step 408. The scrambling code information, the channel offset information, and the diversity mode information are provided as demodulation information for a finger group of an associated cell. The CMC 310 inputs reference finger information (SetCell#RefFinger) serving as a selection signal to the MUX for an associated cell in step 410, and loads SFN information (SetCell#Sfn) to the SFN timing management counter for an associated cell in step 412.

In step 414, the CMC 310 determines if demodulation information and demodulation timing information on received data for all cells have been loaded which correspond to the number M of cells. If the information for all cells has been completely loaded, the procedure ends. However, if the information corresponding to the number M of cells has not been completely loaded, the CMC 310 returns to step 402 to load demodulation information and demodulation timing information for the remaining cell.

As described above, the CMC 310 first loads demodulation information on received data for cells before processing cell-by-cell control information provided from the higher layer on a finger-by-finger basis. A task for loading the demodulation information is repeated a predetermined number of times corresponding to the total number M of cells. In the asynchronous system, the number M of cells is established to be less than the number N of fingers. Accordingly, a task for separating the finger control information on the finger-by-finger basis in software of the CMC 310 and the number of commands to be transferred to hardware (that is, a physical layer) are reduced.

As is apparent from the above description, the exemplary embodiments of the present invention have at least the following advantage.

Exemplary embodiments of the present invention can reduce system load and costs by applying a cell-by-cell demodulation timing management method in a UE that simultaneously performs data transmission/reception with a plurality of cells in which transmission timing is different from each other in a soft handover situation in an asynchronous mobile telecommunication system.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for managing cell-by-cell demodulation timings of an asynchronous user equipment (UE) for demodulating multipath signals, received from a plurality of cells, in a plurality of fingers, the method comprising the steps of:
   acquiring mapping information, indicating the plurality of fingers mapped on a cell-by-cell basis, and demodulation information and demodulation timing information managed on the cell-by-cell basis for the plurality of cells;
   grouping the plurality of fingers on the cell-by-cell basis according to the mapping information;
   providing demodulation information for an associated cell to each of the grouped fingers on the cell-by-cell basis;
   demodulating a signal received from the associated cell in the grouped fingers using the demodulation information for the associated cell; and
   managing the cell-by-cell demodulation timings of the grouped fingers according to the demodulation timing information using a system frame number (SFN) and a connection frame number (CFN).

2. The method of claim 1, wherein the demodulation information comprises scrambling codes, channel offsets, and diversity modes indicating demodulation schemes associated with the cells.

3. The method of claim 2, wherein the step of providing the demodulation information comprises the steps of:
   establishing the scrambling codes in the grouped fingers on the cell-by-cell basis;
   establishing the channel offsets in the grouped fingers on the cell-by-cell basis; and
   establishing the diversity modes in the grouped fingers on the cell-by-cell basis.

4. The method of claim 1, wherein the demodulation timing information comprises cell-by-cell SFN information, reference cell information indicating a reference cell of the cells, and cell-by-cell reference finger information indicating reference fingers of the fingers mapped to the cells.

5. The method of claim 4, wherein the step of managing the cell-by-cell demodulation timings comprises the steps of:
   managing the SFN value of an associated cell according to the cell-by-cell SFN information such that the SFN value is synchronized with synchronization timing information of a reference finger of the associated cell according to the cell-by-cell reference finger information;
   selecting the managed SFN value of the reference cell according to the reference cell information; and
   managing the CFN of the UE such that the CFN is synchronized with the selected SFN value, and generating a demodulation reference signal, indicating demodulation timing of the fingers, corresponding to the managed CFN value.

6. An apparatus for managing cell-by-cell demodulation timings of an asynchronous user equipment (UE) for demodulating multipath signals received from a plurality of cells, the apparatus comprising:

a RAKE receiver configured by a plurality of fingers;
a cell management control unit for acquiring mapping information, indicating the plurality of fingers mapped on a cell-by-cell basis, and demodulation information and demodulation timing information managed on the cell-by-cell basis for the plurality of cells, grouping the plurality of fingers on the cell-by-cell basis according to the mapping information, and providing demodulation information for an associated cell to each of the grouped fingers on the cell-by-cell basis; and
a demodulation timing management unit for managing cell-by-cell demodulation timings of the grouped fingers according to the demodulation timing information using a system frame number (SFN) and a connection frame number (CFN).

7. The apparatus of claim 6, wherein the demodulation information comprises scrambling codes, channel offsets, and diversity modes indicating demodulation schemes associated with the cells.

8. The apparatus of claim 7, wherein the cell management control unit establishes the scrambling codes in the grouped fingers on the cell-by-cell basis, establishes the channel offsets in the grouped fingers on the cell-by-cell basis, and establishes the diversity modes in the grouped fingers on the cell-by-cell basis.

9. The apparatus of claim 6, wherein the demodulation timing information comprises cell-by-cell SFN information, reference cell information indicating a reference cell of the cells, and cell-by-cell reference finger information indicating reference fingers of the fingers mapped to the cells.

10. The apparatus of claim 9, wherein the demodulation timing management unit comprises:
a plurality of first multiplexers for selecting synchronization timings of reference fingers for the plurality of cells according to the cell-by-cell reference finger information;
cell-by-cell SFN timing management counters for managing SFN values for the plurality of cells according to the cell-by-cell SFN information such that the SFN values are synchronized with the synchronization timings of the reference fingers selected by the plurality of first multiplexers;
a second multiplexer for selecting the SFN value of the reference cell according to the reference cell information from the SFN values managed by the cell-by-cell SFN timing management counters; and
the CFN timing management counter for managing a CFN of the UE such that the CFN is synchronized with the SFN value selected by the second multiplexer, and generating a demodulation reference signal, indicating demodulation timing of the fingers, corresponding to the managed CFN value.

* * * * *

UNITED STATES PATENT AND TRADEMARK OFFICE
CERTIFICATE OF CORRECTION

PATENT NO. : 7,599,309 B2  Page 1 of 1
APPLICATION NO. : 11/226371
DATED : October 6, 2009
INVENTOR(S) : Suk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 706 days.

Signed and Sealed this

Twenty-eighth Day of September, 2010

David J. Kappos
*Director of the United States Patent and Trademark Office*